(12) United States Patent
Le Paih et al.

(10) Patent No.: US 11,653,657 B2
(45) Date of Patent: May 23, 2023

(54) EQUIPMENT COMPRISING A MOULDING CAVITY MADE OF POROUS MATERIAL, PATTY FORMING MACHINE AND CAVITY WASHING MACHINE COMPRISING SUCH EQUIPMENT

(71) Applicant: MAREL FRANCE, Baud (FR)

(72) Inventors: Jacques Le Paih, Plumeliau (FR); Johannes Martinus Meulendijks, Deurne (NL); Fabrice Le Pabic, Camors (FR); Yohann Pierre, Kervignac (FR)

(73) Assignee: MAREL FRANCE, Baud (FR)

( * ) Notice: Subject to any disclaimer, the term of this patent is extended or adjusted under 35 U.S.C. 154(b) by 460 days.

(21) Appl. No.: 16/646,051

(22) PCT Filed: Sep. 10, 2018

(86) PCT No.: PCT/FR2018/052210
§ 371 (c)(1),
(2) Date: Mar. 10, 2020

(87) PCT Pub. No.: WO2019/048805
PCT Pub. Date: Mar. 14, 2019

(65) Prior Publication Data
US 2020/0275670 A1  Sep. 3, 2020

(30) Foreign Application Priority Data

Sep. 11, 2017  (FR) ...................................... 1758358

(51) Int. Cl.
*A22C 7/00*  (2006.01)
*A22C 17/08*  (2006.01)
(Continued)

(52) U.S. Cl.
CPC .......... *A22C 7/0076* (2013.01); *A22C 7/0069* (2013.01); *A22C 17/08* (2013.01);
(Continued)

(58) Field of Classification Search
CPC ... A22C 7/0076; A22C 7/0069; A22C 7/0061; A22C 7/0038; A22C 7/003; A22C 17/08; A23P 30/10; B08B 3/02; B08B 3/024
(Continued)

(56) References Cited

U.S. PATENT DOCUMENTS 3,205,837 A * 9/1965 Fay ........................ A21C 11/08
                                                                425/99
3,427,649 A   2/1969 Fay
(Continued)

FOREIGN PATENT DOCUMENTS

| EP | 2 468 104 A1 | 6/2012 |
| WO | WO 91/01644 A1 | 2/1991 |
| WO | WO 2016/146519 A2 | 9/2016 |

OTHER PUBLICATIONS

International Search Report, issued in PCT/FR2018/052210, dated Jan. 7, 2019.

*Primary Examiner* — Joseph S Del Sole
*Assistant Examiner* — Lawrence D. Hohenbrink, Jr.
(74) *Attorney, Agent, or Firm* — Birch, Stewart, Kolasch & Birch, LLP

(57) ABSTRACT

A tooling for forming patties from a food mass includes a mould cavity holder; a mould cavity arranged such that it is received in the mould cavity holder, the mould cavity being made of a material porous to a fluid and including an internal face defining a patty forming mould and an external face separated from the internal face by a body of porous material; a clamp for clamping the mould cavity in the mould cavity holder; and a seal placed between the mould
(Continued)

cavity and one of the mould cavity holder and the clamp. The seal is arranged such that it forces a pressure fluid, brought to the external face of the body of porous material to pass therethrough to the internal face.

14 Claims, 11 Drawing Sheets

(51) Int. Cl.
    *A23P 30/10*     (2016.01)
    *B08B 3/02*     (2006.01)

(52) U.S. Cl.
    CPC ............ *A22C 7/003* (2013.01); *A22C 7/0038* (2013.01); *A22C 7/0061* (2013.01); *A23P 30/10* (2016.08); *B08B 3/02* (2013.01); *B08B 3/024* (2013.01)

(58) Field of Classification Search
    USPC ........................................................ 426/512
    See application file for complete search history.

(56) References Cited

U.S. PATENT DOCUMENTS

| | | | |
|---|---|---|---|
| 2005/0220932 A1* | 10/2005 | van der Eerden ... | A22C 7/0092 426/1 |
| 2015/0343671 A1* | 12/2015 | Van Gerwen .......... | B29C 33/72 134/167 R |
| 2016/0255846 A1* | 9/2016 | Lindee ................. | A22C 7/0084 |

\* cited by examiner

US 11,653,657 B2

EQUIPMENT COMPRISING A MOULDING CAVITY MADE OF POROUS MATERIAL, PATTY FORMING MACHINE AND CAVITY WASHING MACHINE COMPRISING SUCH EQUIPMENT

FIELD OF THE INVENTION

The invention relates to equipment for the formation of patties from a food mass as well as forming and washing machines using this equipment.

BACKGROUND OF THE INVENTION

The streamlining of production lines, in particular in the context of the creation of patties, such as minced-beef patties, from a food mass, such as a mass of meat for example, leads to creating various shapes of patties on the same production line. For this, the machines for producing patties allow to change the formation moulds between two different production campaigns, the unused moulds being thus cleaned and stored with a view to a future reuse. Such moulds are, for example, described in the document WO 2016/146519. However, such moulds comprising a plurality of cavities are currently voluminous and heavy, and thus difficult to manipulate by the operators and also difficult to clean. Moreover, their changing on a production line requires a relatively significant time of stoppage of the line. Moulds were thus developed, the cavities of which can be detached from the rest of the mould body, which is easier to manipulate. Moreover, such cavities are made from a porous material, such as porous stainless steel, allowing the use of pressurised air on an outer face of the cavity, opposite to the moulding recess of the cavity, which thus passes through the thickness of porous material in order to eject the patty thus formed. However, the cleaning of these cavities is problematic.

OBJECT OF THE INVENTION

One goal of the invention is to provide equipment for the formation of patties which remains simple, easy and fast to change, while allowing ejection of the patty formed and cleaning of the cavity that are optimal.

SUMMARY OF THE INVENTION

For this purpose, according to the invention, equipment is provided for the formation of patties from a food mass comprising:
  a cavity holder;
  a cavity arranged so as to be received in the cavity holder, the cavity being made from a material porous to a fluid and comprising an inner face defining a mould for forming a patty and an outer face separated from the inner face by a thickness of porous material; and,
  a clamping tool for clamping the cavity in the cavity holder,
the equipment further comprising a sealing joint interposed between the cavity and one out of
the cavity holder and the clamping tool, the sealing joint being arranged so as to constrain the passage of a pressurised fluid through the thickness of porous material, brought onto the outer face, from the latter towards the inner face.

Thus, such a structure of the equipment with a cavity made of porous material allows to preserve the advantages of manipulation, while the use of a sealing joint between the cavity and one out of the cavity holder and the clamping tool allows to ensure that the fluid passes through the thickness of porous material of the cavity with pressures sufficiently high to optimise the ejection and the cleaning.

Advantageously, but optionally, the equipment according to the invention has at least one of the following additional technical features:
  the equipment comprises a second sealing joint interposed between the cavity and the other out of the cavity holder and the clamping tool;
  the equipment comprises a fluid intake chamber, partly defined by the outer face of the cavity;
  the fluid intake chamber is defined by a recess made in the cavity holder;
  the cavity holder comprises a pressure measuring duct in the fluid intake chamber;
  the cavity holder comprises a fluid inlet means;
  the clamping tool being a clamping nut, the fluid intake chamber is defined by a hollow made in the clamping nut;
  the clamping nut comprises a fluid intake duct into the fluid intake chamber;
  the equipment further comprises a spacer positioned between the cavity and the clamping nut, the spacer partly defining the fluid intake chamber;
  the spacer comprises a fluid distribution grille onto the outer face of the cavity; and
  the equipment further comprises an additional sealing joint interposed between the spacer and the cavity and/or an additional sealing joint interposed between the spacer and the clamping nut.

According to the invention, a patty forming machine is also provided for forming patties from a food mass, comprising a mould support, the mould support comprising at least one set of equipment having at least one of the preceding technical features.

Advantageously, but optionally, the patty forming patty forming machine according to the invention has at least the following additional technical features:
  the mould support is one out of a drum, a rotary plate and a slide.

According to the invention, a cavity washing machine for washing cavities is also provided, comprising a washing fluid circuit and at least one set of equipment having at least one of the preceding technical features in fluid connection with the circuit for washing fluid.

Advantageously, but optionally, the washing machine according to the invention has at least one of the following additional technical features:
  the washing fluid comprises a base or an acid; and,
  the washing machine comprises a nozzle for washing the inner face of the cavity.

Other features and advantages of the invention will appear during the following description of embodiments of the latter and of alternatives. In the appended drawings:

DETAILED DESCRIPTION OF EMBODIMENTS

Figure 1:
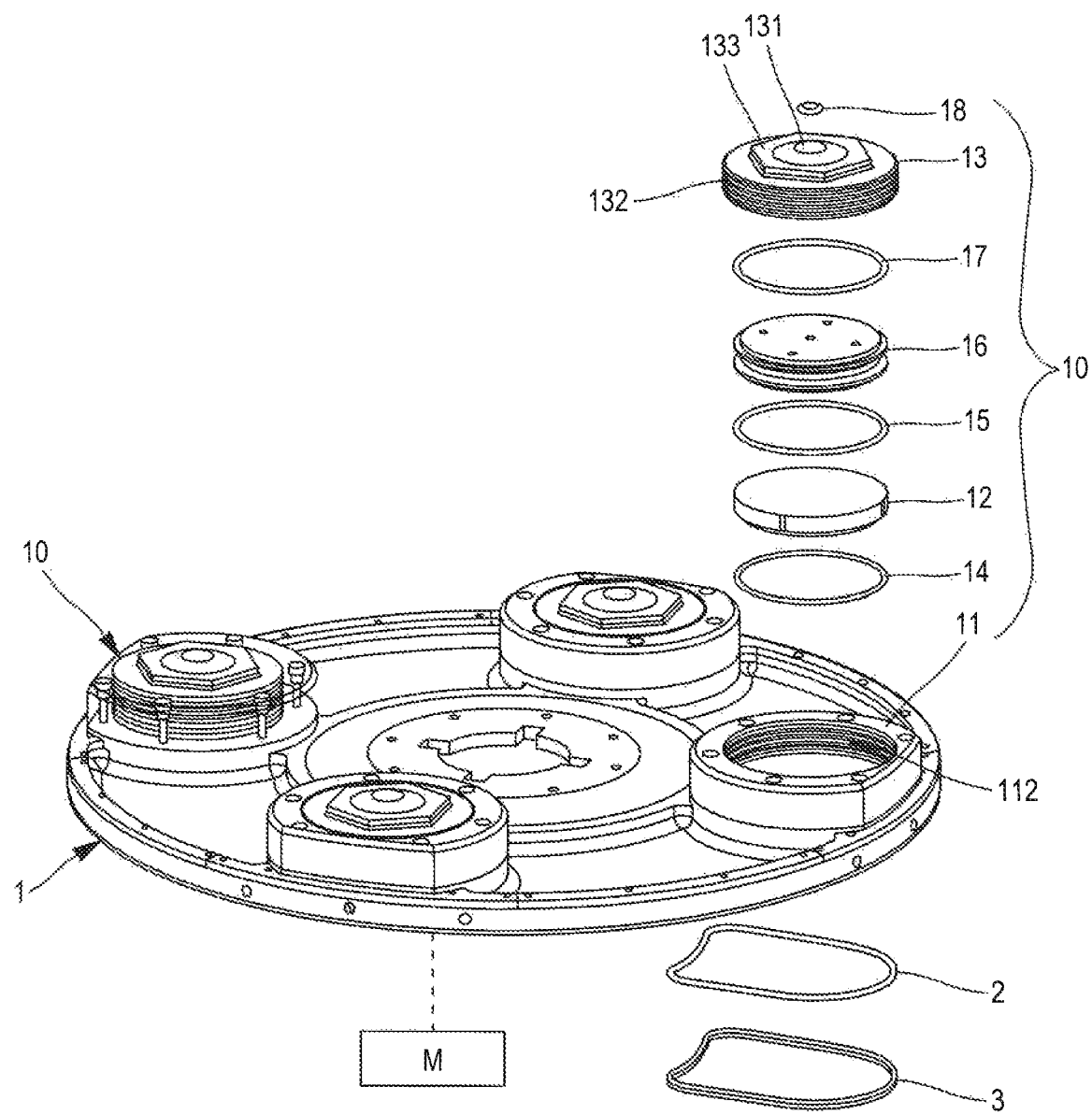
FIG. 1 is a three-dimensional view of a mould of a patty forming machine according to the invention comprising sets of equipment according to the invention, one of which is exploded.
Figure 2:
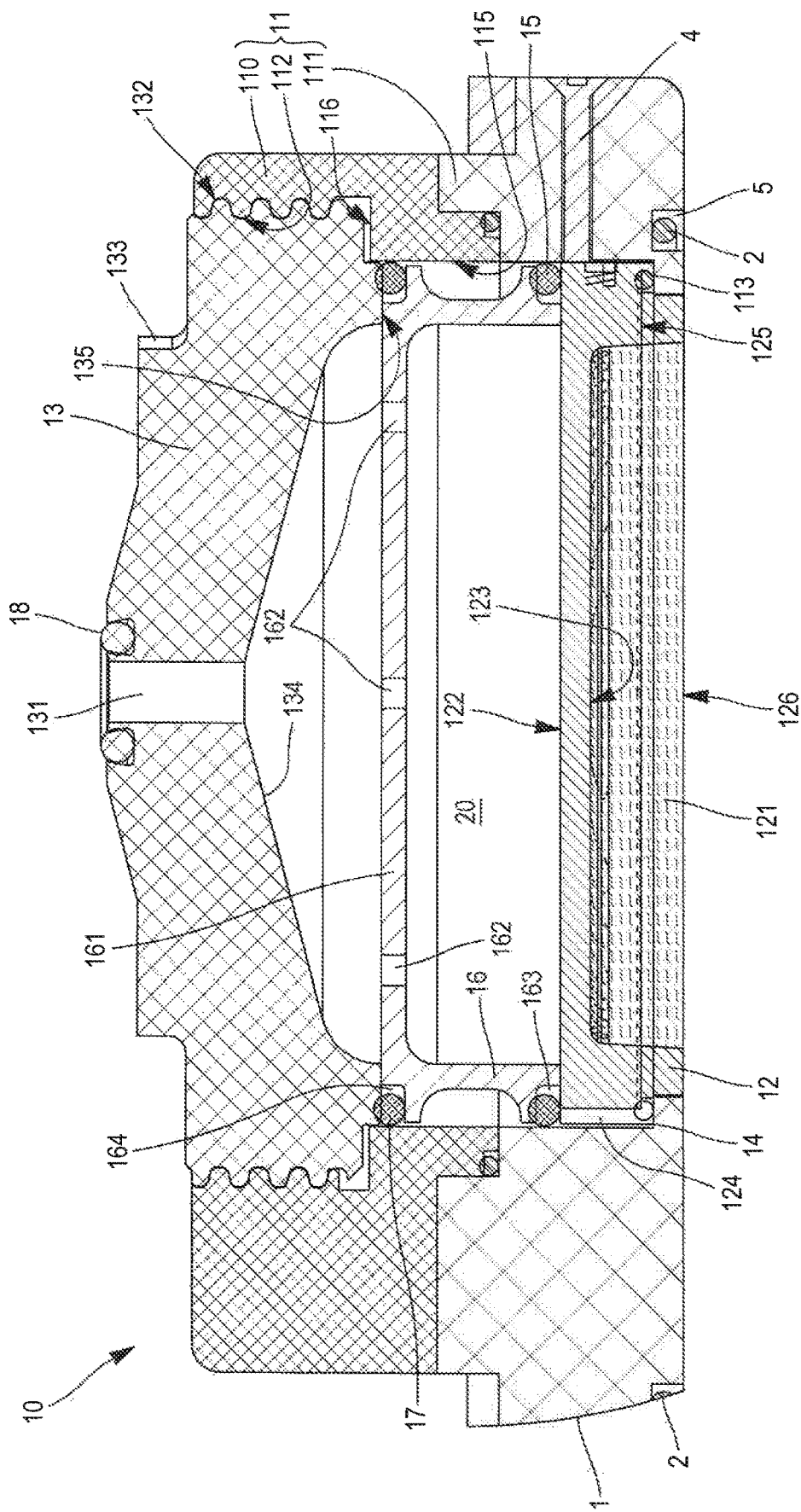
FIG. 2 is a cross-sectional partial view of one of the sets of equipment of FIG. 1.

In reference to FIGS. 1 and 2, a first embodiment of equipment 10 according to the invention and of a use of the latter in a machine M for forming patties is going to be described. The mould, here in the form of a circular plate 1, is rotary, on which a series of sets of equipment 10 according to the invention are positioned, preferably uniformly distributed on a circumference of the circular plate 1. In the embodiment illustrated in FIG. 1, the circulate plate 10 comprises four sets of equipment 10 according to the invention. This type of mould is used with a supply of food mass from below, a sealing system, composed of a joint 2 and of a cord 3, both received in a groove 5 open at an inner face of the circular plate 1 surrounding the equipment 10 according to the invention, being provided in order to ensure the supply.

The equipment 10 according to the invention is thus intended for the formation of patties from a food mass. It comprises, here:

A cavity holder 11 fastened onto the circular plate 10;

A cavity 12 received in the cavity holder 11;

A clamping means, in the form of a clamping nut 13 for clamping the cavity 12 in the cavity holder 11; and, A first sealing joint 14, here positioned between the cavity 12 and the cavity holder 11.

In an alternative realisation, the first sealing joint 14 is interposed between the cavity 12 and the clamping nut 13.

Moreover, optionally, the equipment 10 according to the invention further comprises, here:

A second sealing joint 15;

A spacer 16; and,

A third sealing joint 17, the second sealing joint 15 being interposed between the cavity 12 and the spacer 16, and the third sealing joint 17 being interposed between the spacer 16 and the clamping nut 13.

In an alternative realisation, the second sealing joint 15 is positioned between the cavity 12 and the clamping nut 13, the equipment not comprising a spacer 16.

More in detail, the cavity 12 is made from a food-grade porous material, such as a stainless steel, in particular 316L. It comprises a hollow inner face 123 forming a mould for forming a patty 121, and an outer face 122 separated from the inner face 123, in particular from a bottom of the mould for forming a patty 121, this bottom being part of the inner face 123, by a thickness of porous material. Here, the outer face 122 is flat. On a lateral face forming a periphery of the cavity 12, the latter comprises a bearing rim 125 extending along the entire length of said periphery of the cavity 12, as well as a series of notches 124 intended for the manipulation of the cavity 12 using a suitable tool, not shown. Here the cavity 12 has the overall shape of a cylinder of revolution. Alternatively other shapes are possible such as a square, rectangular or polygonal shape or the shape of an ellipse.

In the embodiment illustrated in FIGS. 1 and 2 of the equipment 10 according to the invention, the cavity holder 11 is in two portions 110 and 111. The portion 111 is integrated into the circular plate 1 and is made in one piece with the latter. The portion 110 is added onto the portion 111 and fastened to the latter. In an alternative realisation the cavity holder 11 is in one piece, as one single part, added onto the circular plate 1 and fastened to the latter.

Moreover, the cavity holder 11 comprises an orifice 115 for receiving the cavity 12, the reception orifice 115 having a shape complementary to the shape of the cavity 12. Thus, the cavity 12 is received at least slidingly in the orifice 115 of the cavity holder 11. So as to retain the cavity 12 during an installation of the latter, the cavity holder 11 comprises a retaining rim 113 arranged in the orifice 115. During the installation of the cavity 12 in the cavity holder 11, the cavity 12 is slidingly inserted into the reception orifice 115 until the bearing rim 125 of the cavity 12 comes in contact with the retaining rim 113 of the cavity holder 11. Alternatively, the first sealing joint 14 is positioned sandwiched between the bearing rim 125 and the retaining rim 113.

The retaining 113 and bearing 125 rims, with the presence or not of the first joint 14, are arranged in such a way that, once the cavity 12 is in place in the cavity holder 11, an opening 126 of the mould for forming a patty 121 is substantially in a plane of the lower face of the circular plate 1.

Moreover, the cavity holder 11 comprises a threaded portion 112, here located above the orifice 115 and connected to the latter by an inner rim 116. Thus, the threaded portion 112 extends the orifice 115 for receiving the cavity 12 upwards. The threaded portion 112 is intended to receive the clamping nut 13 which comprises, for this purpose, a complementary thread 132. The clamping nut 13 further comprises:

An implementation cavity 133, here having a hexagonal shape, intended to cooperate with a suitable clamping tool complementary to the implementation cavity 133 for the clamping and the unclamping of the clamping nut 13 in the cavity holder 11.

A hollow 134 which, during a mounting of the equipment 10 according to the invention, is located facing the outer face 122 of the cavity 12, so as to define an intake chamber 20 in the equipment 10 according to the invention.

A bearing face 135 defining an opening of the hollow 134 arranged so as to be inserted into the orifice 115.

An intake duct 131 opening into the intake chamber 20 at the hollow 134. Above the intake duct 131, there is a sealing joint 18 surrounding means for fluid connection of a pipe for supplying fluid. The intake duct 131 allows to fill the intake chamber with a fluid.

In a first arrangement of the equipment 10 according to the invention, the cavity 12 is positioned in the cavity holder 11, the bearing 125 and retaining 113 rims being in contact. Then, the first sealing joint 14 is installed on the outer face 122 of the cavity 12 (in a similar manner to the second sealing joint 15 illustrated in FIG. 2). Then, the clamping nut 13 is installed and clamped, the first sealing joint 14 thus being sandwiched and compressed between the bearing face 135 of the clamping nut 13 and the outer face 122 of the cavity 12. The first sealing joint 14 thus ensures the sealing of the intake chamber 20 thus formed and defined by the outer face 122 of the cavity 12 and the hollow 134 of the clamping nut 13. In an alternative realisation of this arrangement, the first sealing joint 14 is positioned sandwiched between the bearing rim 125 and the retaining rim 113 and a second sealing joint 15 is positioned sandwiched between the bearing face 135 of the clamping nut 13 and the outer face 122 of the cavity 12.

In a second arrangement of the equipment 10 according to the invention, the latter comprises the spacer 16 which is interposed between the clamping nut 13 and the cavity 12. The spacer is thus slidingly disposed in the orifice 115 of the cavity holder 11 and participates in the formation of the intake chamber 20. The spacer 16 comprises a first peripheral clearance 164 at an end facing the outer face 122 of the cavity 12. The second sealing joint 15 is received in this first clearance 164 so as to be sandwiched between the spacer 16 and the outer face 122 of the cavity 12. Similarly, the spacer 16 comprises a second clearance 165. The third sealing joint 17 is received in this second clearance 165 so as to be sandwiched between the spacer 16 and the bearing face 135 of the clamping nut 13. The sealing of the intake chamber 20 is thus ensured by the second 15 and third 17 sealing joints.

The spacer 16 further comprises a distribution grille 161 comprising a series of non-blind passages 162. The distribution grille 161 extends through the intake chamber 20, cutting the latter into two portions: a portion between the distribution grille 161 and the hollow 134 of the clamping nut 13, and a portion between the distribution grille 161 and the outer face 122 of the cavity 12. The role of this distribution grille 16 is to distribute the fluid injected at high speed into the intake chamber 20 onto the outer face 122 of the cavity 12. Thus, the pressure exerted by the fluid injected at high speed is better distributed over the outer face 122 of the cavity 12, and consequently, through the thickness of porous material, at the bottom of the inner face 123 of the cavity 12: this allows fast and optimal ejection of the patty formed in the mould for forming a patty 121.

Figure 3:
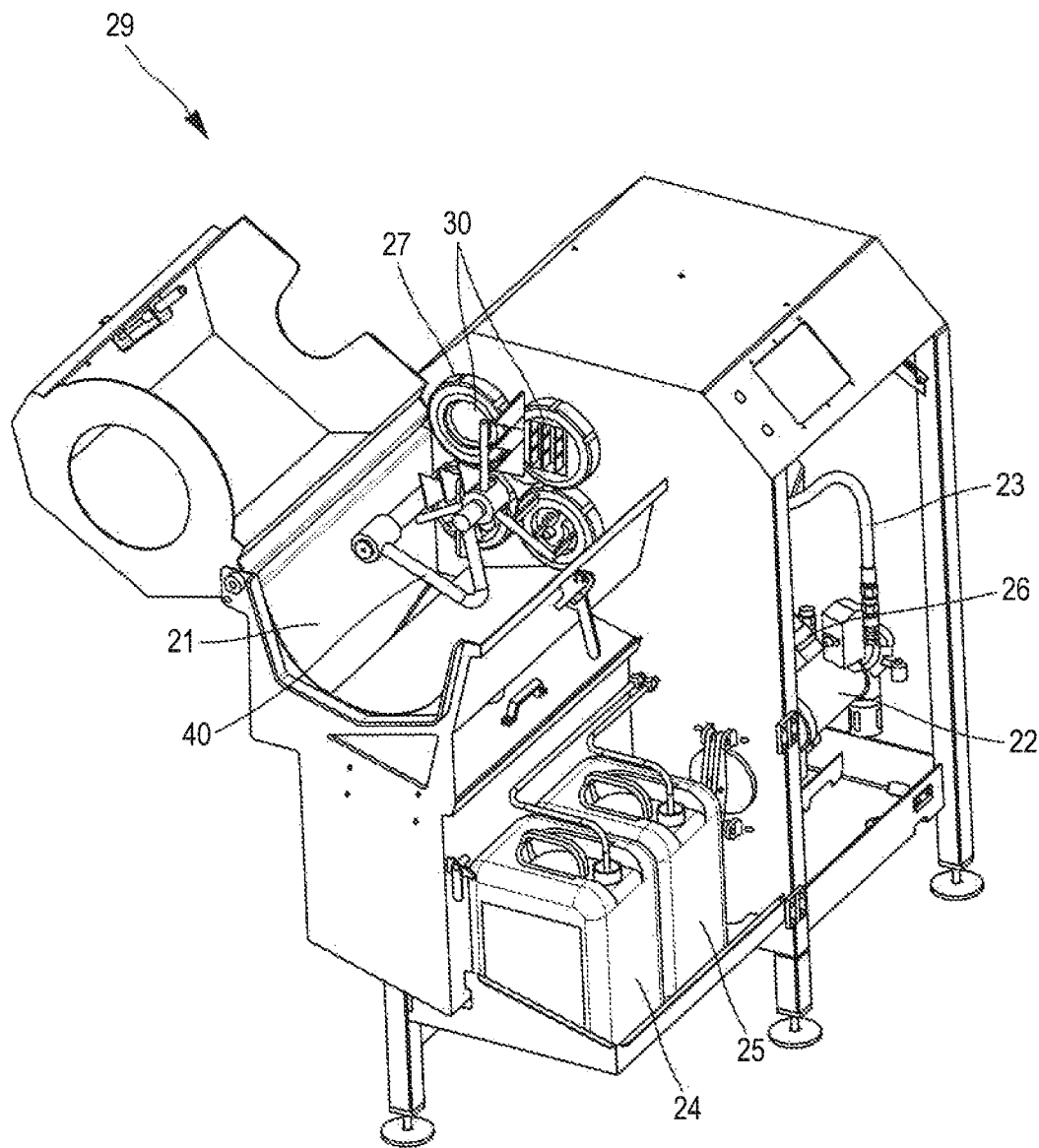
FIG. 3 is a three-dimensional view of a washing machine according to the invention.
Figure 5:
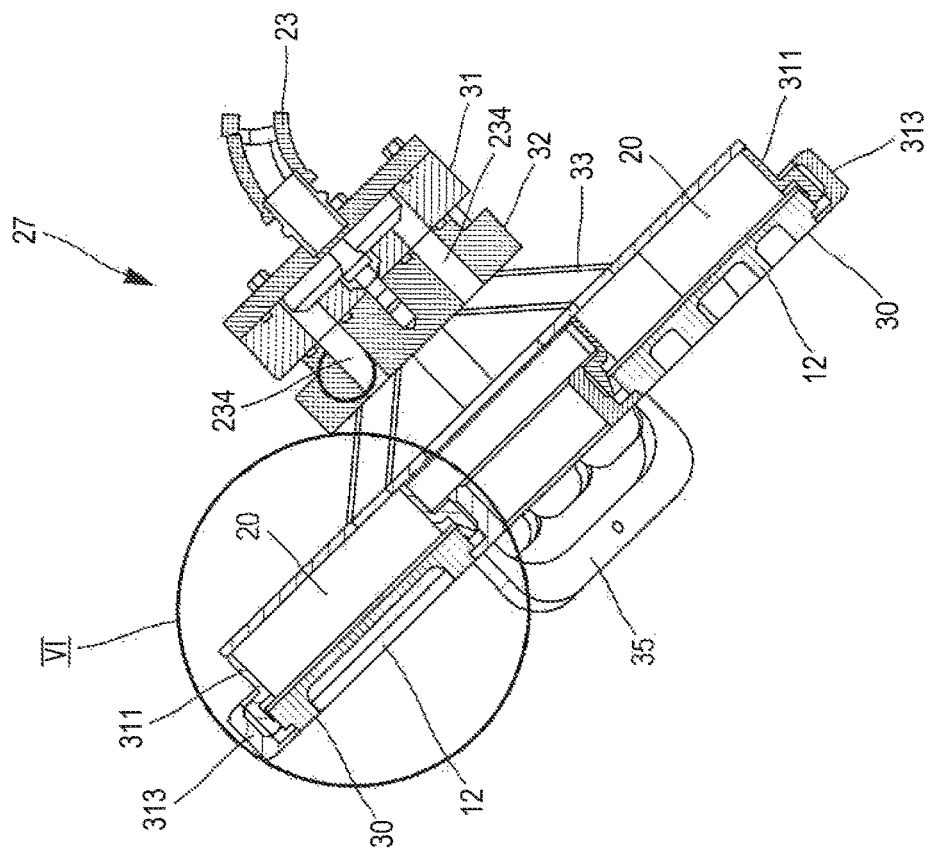
FIG. 5 is a cross-sectional view of the washing plate of FIG. 4.

In reference to FIG. 3, a washing machine 29 for washing cavities 12 previously described is going to be described. The washing machine 29 comprises an accessible washing compartment 21 in which a retractable rotor 40 with nozzles and a series of sets of equipment 30 according to the invention, here four in number, forming a washing plate 27, are arranged. Both the rotor 40 with nozzles, and the washing plate 27, are fluidly connected to a pump 22 for supplying washing fluid contained in tanks 24, 25: the tank 24 comprises a washing fluid comprising a base and the tank 25 comprises a washing fluid d comprising an acid, or vice versa. A pipe 23 fluidly connects the pump 22 to the washing plate 27 and a pipe 26 fluidly connects the pump 22 to the rotor 40 with nozzles.

Figure 12:
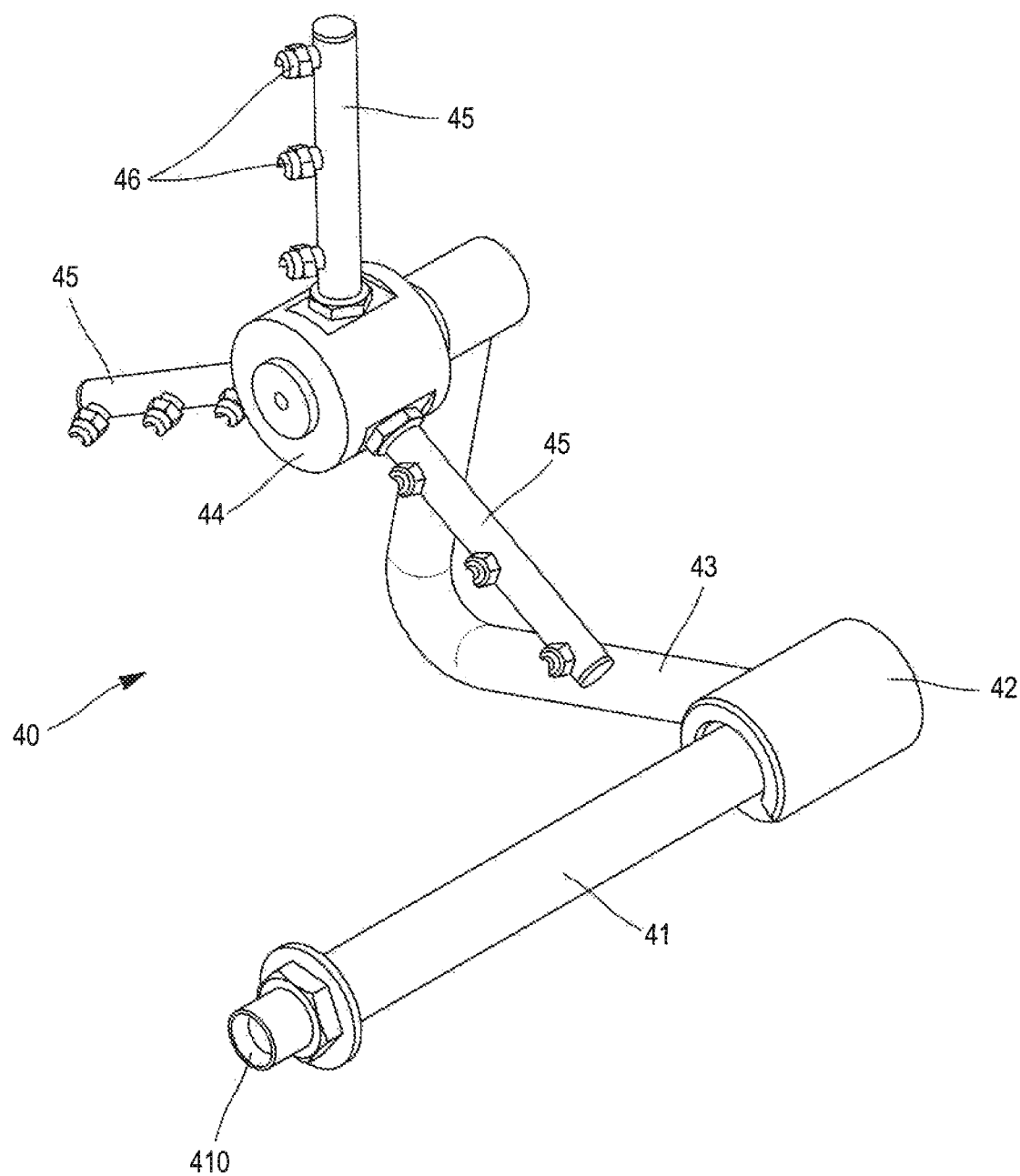
FIG. 12 is a three-dimensional view of a system of washing nozzles of the machine of FIG. 3.

In reference to FIG. 12, the rotor 40 with nozzles is going to be briefly described. The latter comprises a fixed supply tube 41 comprising at one end fluid means 410 for connection to the pipe 26 and at another end a pivot link 42 with an elbowed tube 43. The elbowed tube 43 forms arm at the end of which a hub 44 is mounted from which a series of lines 46 leaves, here three in number. The hub 44 is rotatably mounted on the end of the elbowed tube 43 and ensures a fluid connection between the latter and the lines 46. The lines 46 are provided with projection nozzles 46, here three in number per line 45. The nozzles 46 are slightly inclined with respect to a perpendicular to a plane comprising the series of lines 45: thus, during a projection of washing fluid by the nozzles 46, their inclination leads to a movement of rotation of the hub 44 about its axis. The pivot link 42 fluidly connects the fixed supply tube 41 to the elbowed tube 43 while allowing a movement of retraction of rotation of the latter in order to move the series of lines 46 away from a washing position in which the nozzles 46 are facing the washing plate 27 formed by the sets of equipment 30 according to the invention, toward a position of intervention giving access to the sets of equipment 30 according to the invention. The rotor 40 with nozzles allows to clean the surface of the mould for forming a patty 121 by ensuring an evacuation of the pieces of food remaining as well as the waste that is extracted from the porous material of the cavity 12.

In reference to FIGS. 4 to 8, a first embodiment of the washing plate 27 is going to be described. Here, the washing plate 27 comprises four sets of equipment 30 according to the invention. In this embodiment of the equipment 30 according to the invention, the latter comprises a cavity 12, a cavity carrier 311 arranged so as to receive the cavity 12, the first sealing joint 14 and a clamping means, here in the form of a clamping nut, 313.

The cavity carrier 311 comprises a recess forming the intake chamber 20, the recess being defined by a bottom 3113 and a lateral wall 3114 and comprising a recess opening 3111. A furrow 3112 is made on a circumference surrounding the recess opening 3111. The furrow 3112 receives the first sealing joint 14. In the continuation of the recess opening 3111, the cavity holder 311 comprises a housing 3115 for receiving the cavity 12, here the housing 3115 has a tapered shape. In a centrifugal manner, the housing 3111 is surrounded by a lateral outer threaded wall 3116 of the cavity holder 311.

Moreover, the cavity holder 313 comprises a means 33 for intake of the fluid, here washing fluid, opening into the intake chamber 20 by the bottom 3113.

Here, the clamping nut 313 has the shape of a ring, one lateral inner wall 3132 of which is threaded in a manner complementary to the threaded wall 3116 in such a way as to cooperate with one another. The clamping nut 313 further comprises a centripetal rim 3131. Moreover, the clamping nut 313 comprises implementation means 3133, here grooves, intended to cooperate with a clamping tool 35 adapted for clamping and unclamping the clamping nut 313 in the cavity holder 311.

During an assembly of the equipment 30 according to the invention, the cavity 12 is installed in the housing 3115, the outer face 122 of the cavity bearing on the first sealing joint 14 completely forming the intake chamber 20. Then, the clamping nut 313 is screwed onto the cavity holder 311 by making the threaded walls 3116 and 3132 cooperated with one another until the rim 3131 bears on the bearing rim 125 of the cavity 12, and the opening 126 of the mould for forming a patty 121 is substantially in a plane of an outer face of the rim 3131, the first sealing joint being compressed in order to ensure the sealing between the outer face 122 of the cavity 12 and the cavity holder 311.

The various sets of equipment 30 according to the invention of the washing plate 27 are connected to each other by their respective bottom 3113, which are, here made in one piece with each other. The intake means 33 are formed by portion of tube mounted on a face of a connection disc 32 comprising as many internal ducts 234 perpendicular to the plane of the connection disc 32 as intake means 33 of the washing plate 27. A distribution disc 31 is mounted on the other face of the connection disc 32. The distribution disc 31 comprises, opening onto a face facing the other face of the connection disc 32, as many outlets as there are inner ducts in the distribution disc 32. On the opposite face of the distribution disc 31, the latter comprises a fluid connection with the pipe 23, the latter being simultaneously fluidly connected to all the outlets of the distribution disc 31 by an inner chamber for distribution of the fluid arranged in the distribution disc 31. Thus all the outlets, and thus all the intake chambers 20 of the washing plate 27, are supplied simultaneously. Moreover, the assembly of the distribution 31 and connection 32 discs is carried out through an orifice of a wall of the washing compartment 21, the edges of said orifice being sandwiched between the two distribution 31 and connection 32 discs.

Figure 9:
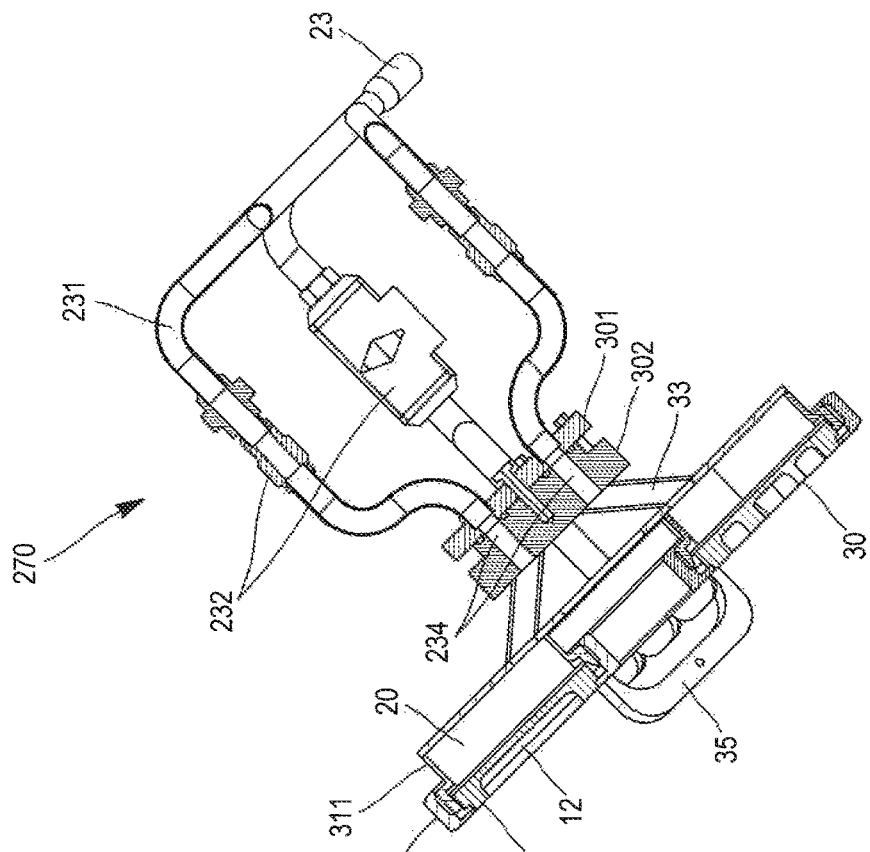
FIG. 9 is a cross-sectional view of the washing plate of FIG. 8.
Figure 8:
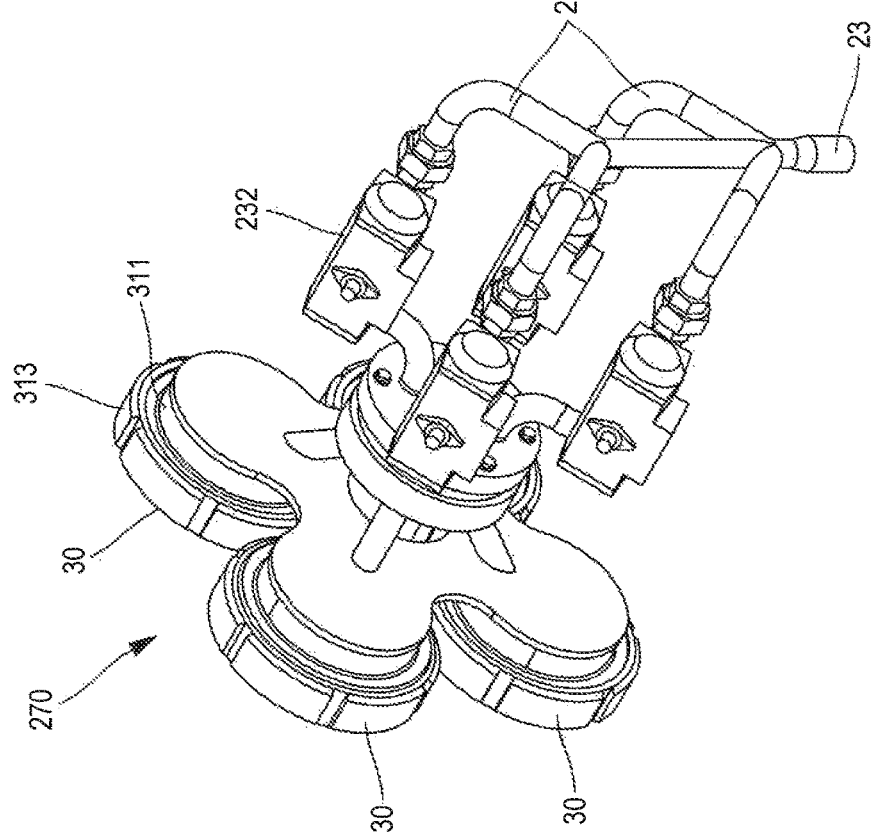
FIG. 8 is a rear three-dimensional view of a second embodiment of a washing plate of the washing machine of FIG. 3.

Now in reference to FIGS. 8 and 9, a second embodiment of the washing plate 270 is going to be described. Only the differences of the washing plate 270 with respect to the preceding washing plate 27 are going to be described: said differences are located at the connection and distribution discs. The connection disc 302 is similar to the connection disc 32 in its shape and in its role. The distribution disc 31 is replaced by a distribution assembly comprising:

A second connection disc 301 comprising as many inner ducts perpendicular to the plane of the connection disc 301 as inner ducts 234 of the connection disc 302. the assembly of the two connections discs 301 and 302 is carried out through an orifice of a wall of the washing compartment 21, the edges of said orifice being sandwiched between the two connection discs 301 and 302.

A series of bypasses 231 in a number identical to that of the inner ducts 234 of the connection disc 302 and fluidly connected to the inner ducts of the second connection disc 301. The bypass 231 joining up fluidly on the pipe 23.

A series of operated valves 232, of the solenoid valve type, in a number identical to that of bypasses 231: each of the bypasses 231 being thus equipped with a dedicated operated valve 232.

Such a structure allows to differentially supply the various intake chambers 20 of the washing plate 270 so as to adapt the washing to the cavity 12 effectively positioned in the equipment 30 according to the invention in question.

Regardless of the embodiment of the washing plate 27,270, the operation of the washing machine 29 is identical: the washing fluid is pumped by the pump in one of the tanks 24 or 25 and send by the latter under pressure into:

the various intake chambers 20 of the equipment 30 according to the invention, the structure of which previously described forces the pressurised washing fluid to pass through the porous material of the cavity 12 from the outer face 122 towards the inner face 123 in order to ensure the optimal cleaning of the pores.

The nozzles 46 of the rotor 40 with a nozzle.

Figure 11:
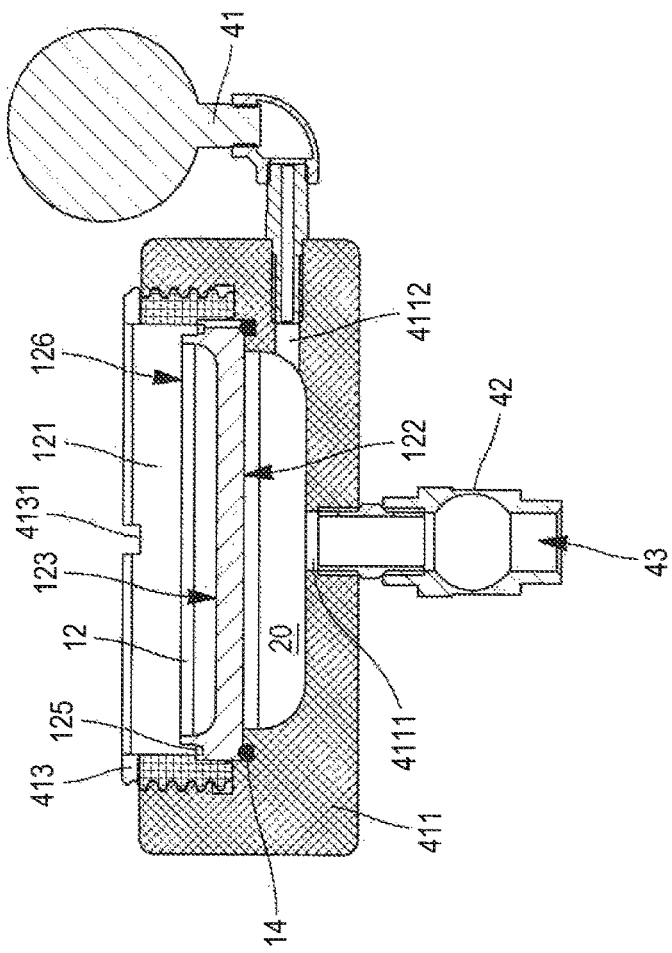
FIG. 11 is a cross-sectional view of the test machine of FIG. 10.
Figure 10:
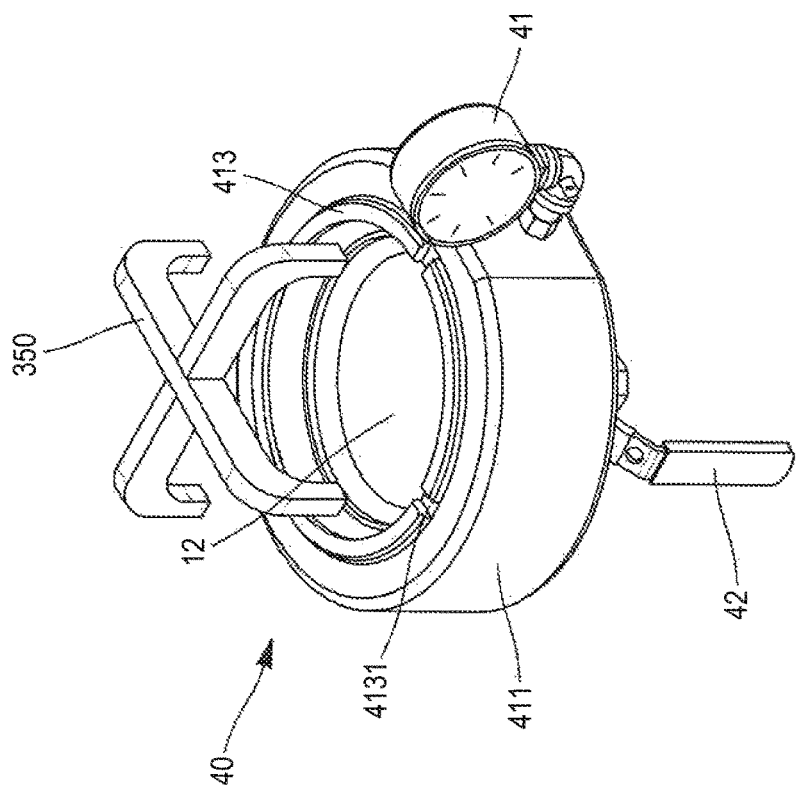
FIG. 10 is a three-dimensional view of a test machine according to the invention.

In reference to FIGS. 10 and 11, a test device for the cavities 12 will now be described. Here, this test device forms equipment 40 according to the invention. The latter comprises:

A cavity holder 411 comprising a recess forming the intake chamber 20. The bottom of the recess comprises a means 411 for intake of fluid on the which a valve 42, of the quarter-turn type, is arranged, itself fluidly connected to a source of pressurised fluid 43. Moreover, the cavity holder 411 comprises a duct 4112 for measuring a pressure in the intake chamber 20, a pressure sensor 41, such as a manometer, being connected onto the measurement duct. Like for the preceding cavity holder 311, the cavity holder 411 comprises a circumferential groove for receiving the first sealing joint 14 surrounding an opening of the recess forming the intake chamber 20 and on which the outer face 122 of the cavity 12 to be tested bears. In the continuation of this opening, the cavity holder 411 comprises a threaded inner lateral wall.

A clamping means, in the form of a clamping nut, 413 in the shape of a ring comprising a complementary threaded outer lateral wall arranged to cooperate with the threaded inner lateral wall of the cavity holder 411. The clamping nut 413 comprises implementation means 4131, here notches, intended to cooperate with a clamping tool 350 adapted for the clamping and the unclamping of the clamping nut 413 in the cavity holder 411.

During an assembly of the equipment 40 according to the invention, the cavity 12 is positioned in the cavity holder 411 in such a way that the outer face 122 of the cavity bears on the first sealing joint 14 completely forming the intake chamber 20. Then, the clamping nut 413 is screwed onto the cavity holder 411 by making the threaded walls cooperate with one another until the clamping nut 413 bears on the bearing rim 125 of the cavity 12. Such a test device for the cavities 12 allows to simply measure the performance of the porosity of the cavities 12 to a pressurised fluid, such as air. This device also allows to verify the proper cleaning of the cavities 12.

Figure 13:
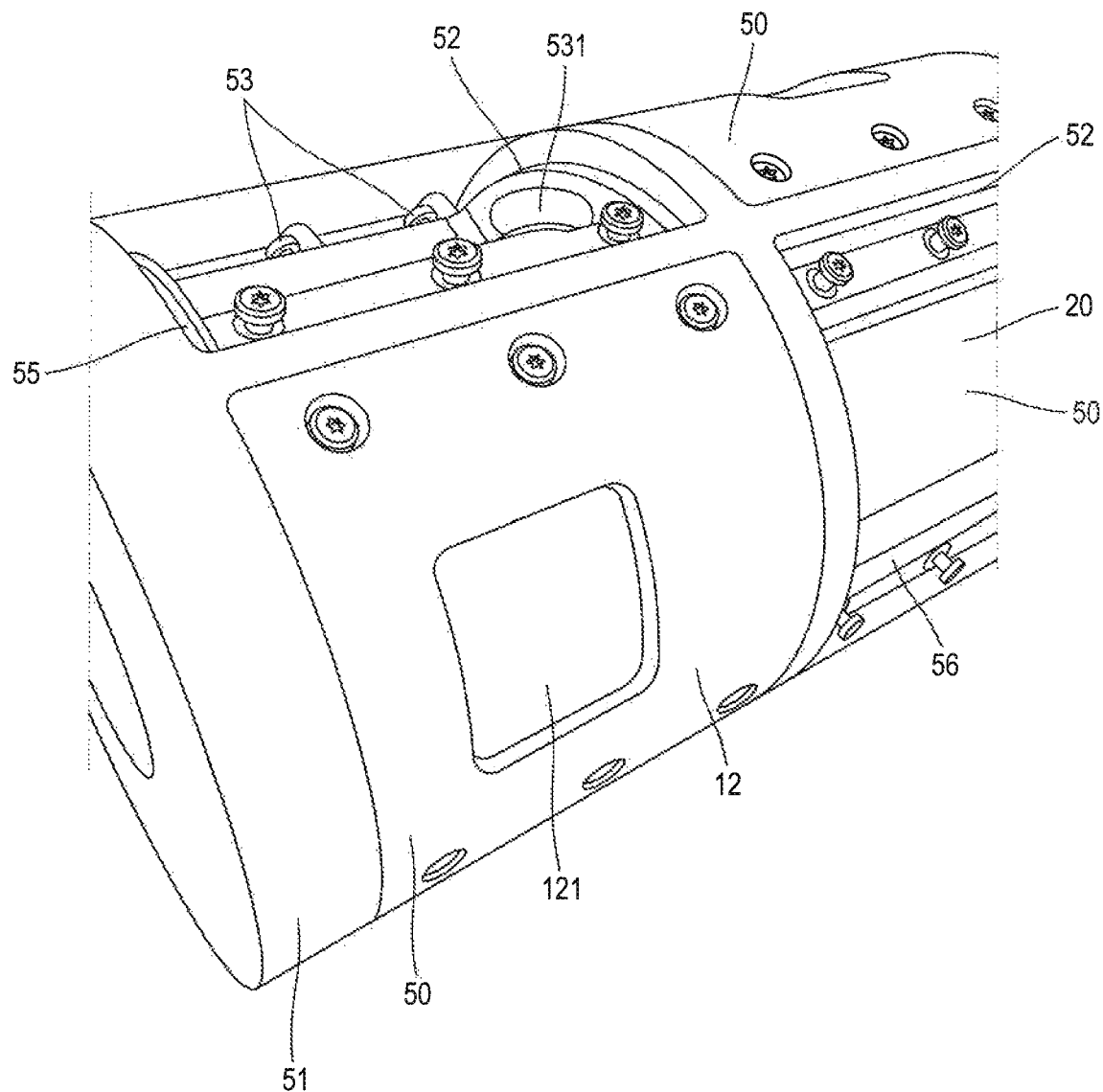
FIGS. 13 and 14 are three-dimensional partial views of a second embodiment of a mould of a patty forming machine according to the invention comprising sets of equipment according to the invention; and, FIG. 15 is a three-dimensional partial view of the washing machine according to the invention adapted to the mould of FIGS. 13 and 14.
Figure 14:
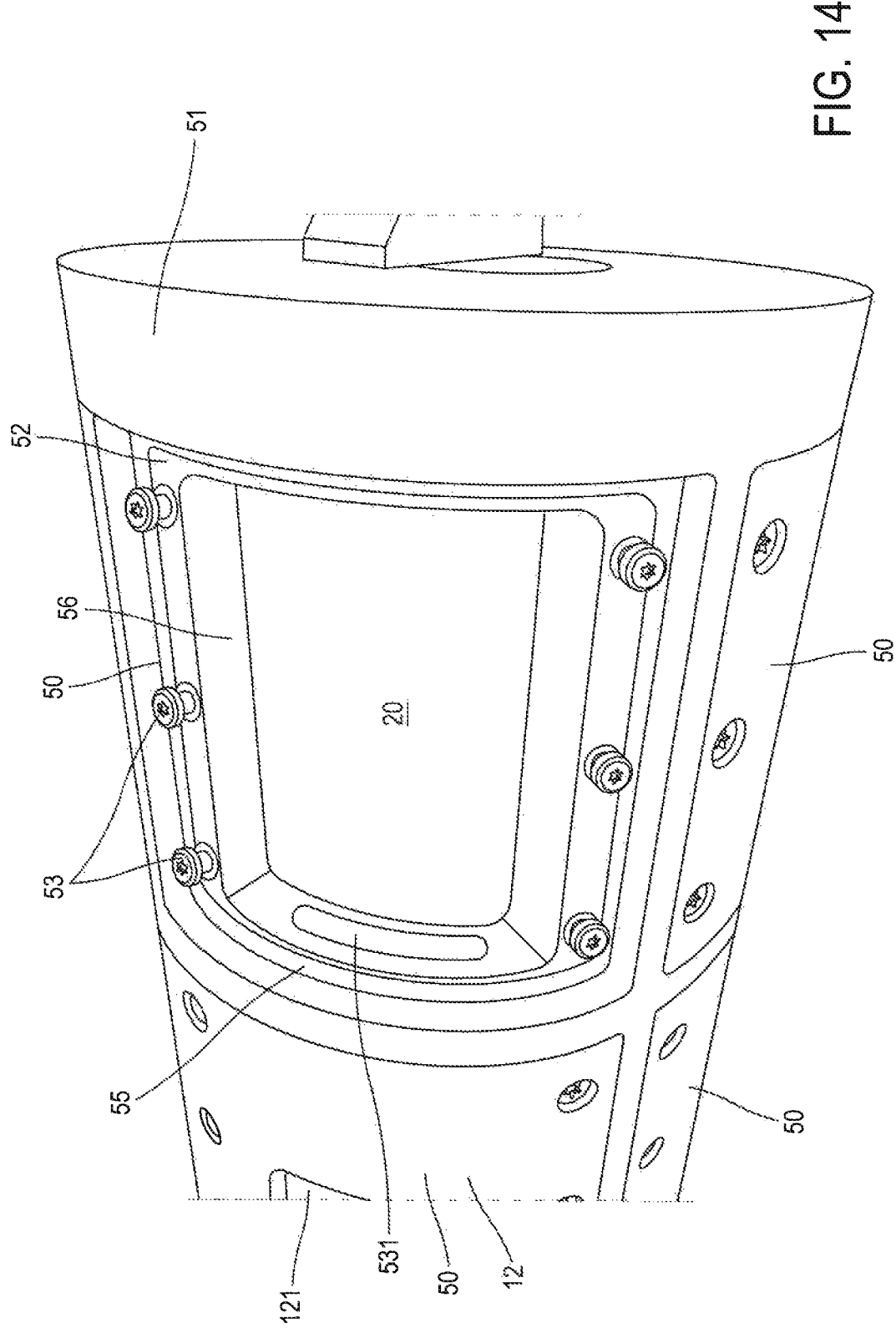

Now, in reference to FIGS. 13 and 14, a second embodiment of equipment 50 according to the invention is going to be described. The mould, here, is in the form of a drum 51, rotating about a longitudinal axis and on the outer periphery of which a series of sets of equipment 50 according to the invention are positioned, preferably uniformly distributed around an outer circumference of the drum 51 and according to generatrices of the drum 50. In the embodiment illustrated in FIG. 13, four sets of equipment 50 according to the invention are visible, two sets of equipment of which have their cavity 12 removed. Like above for the equipment 10 according to the invention, the equipment 50 according to the invention is intended for the formation of patties from a food mass. Here, the equipment 50 comprises:

A cavity holder 52 arranged in a thickness of the drum 51;

A cavity 12 received in the cavity holder 52;

A means, in the form of a series of clamping screws, 53 for clamping the cavity 12 in the cavity holder 52; and A first sealing joint 55, here positioned between the cavity 12 and the cavity holder 52.

Moreover, a spacer 56 is arranged in the cavity holder 52 so as to define an intake chamber 20 in the cavity holder 52. The intake chamber 20 is also defined by an outer face 122 of the cavity 12, once the latter is installed in the cavity holder 52.

Moreover, the cavity holder 52 comprises an intake duct 531 opening into the intake chamber 20, here at one of the lateral edges of said intake chamber 20. The intake duct 531 allows to fill the intake chamber 20 with a fluid.

In an arrangement of the equipment 50 according to the invention, after installation of the sealing joint 55, the cavity 12 is positioned in the cavity holder 52 so as to bear on said sealing joint 55. Then the series of clamping screws 53 is installed and tightened, the sealing joint 55 thus being sandwiched and compressed between the outer face of the cavity 12 and a rim of the cavity holder 52. At the end of clamping, said outer face of the cavity 12 thus bears on the spacer 56 and the intake chamber 20 is formed and sealed.

Figure 15:
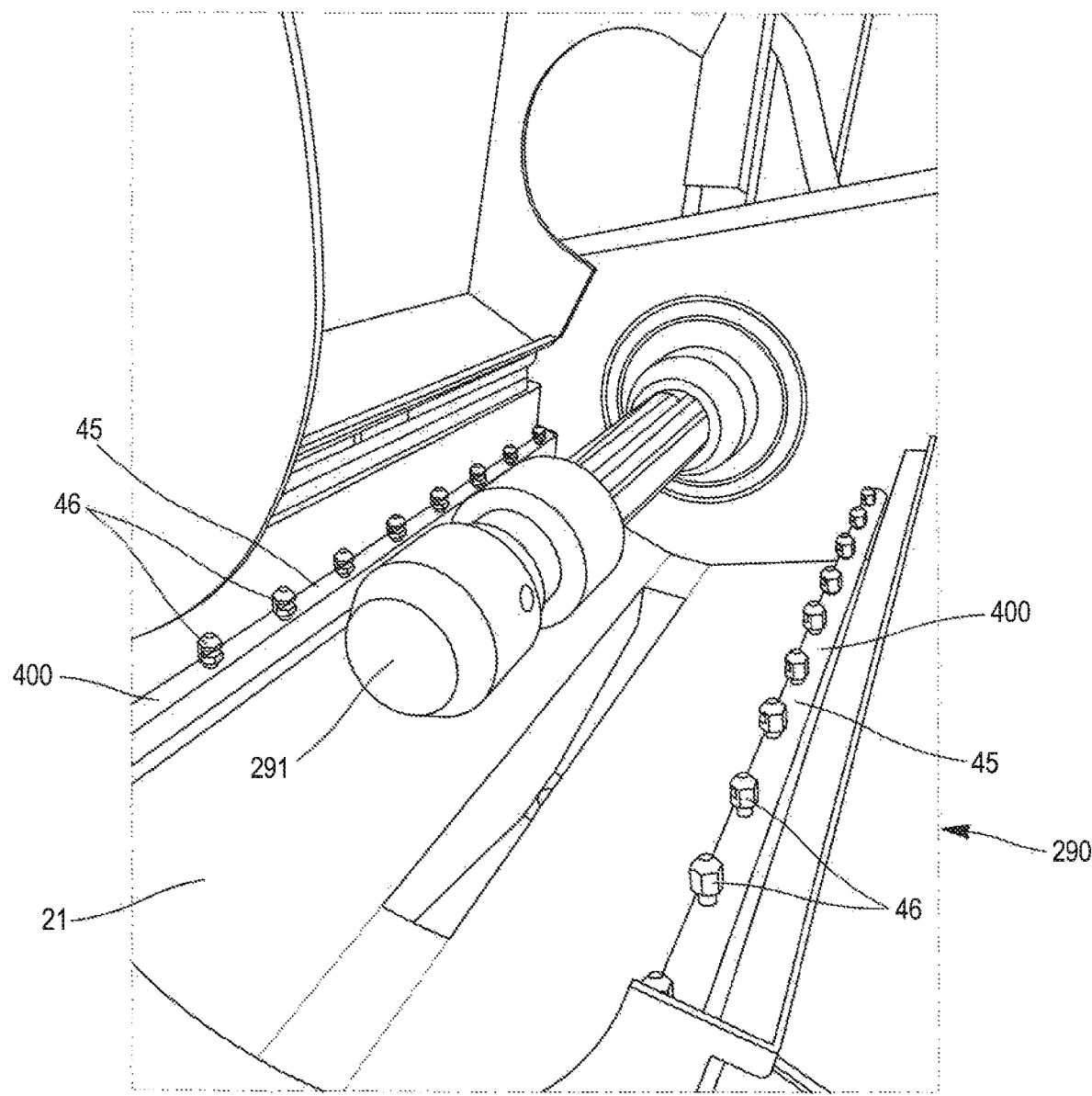

In FIG. 15, an alternative realisation 290 of the preceding washing machine 29 is illustrated. This alternative 290 only differs from the preceding 29 by the arrangement of the washing compartment 21. The washing machine 290 comprises a rotary axis 291 for mounting the drum 51. In an alternative realisation, the rotary mounting axis 291 comprises means for supplying washing fluid to the intake chamber 20 of the drum 51 via the intake ducts 531. Moreover, the washing compartment 21 comprises at least one line of nozzles 400 (here two in number) comprising a fixed supply tube 45 extending in parallel to the rotary mounting axis 291 and comprising a series of projections nozzles 46 which, during a washing, are facing the cavities 12 positioned on the drum 51 itself thus mounted on the rotary mounting axis 291. Like for the preceding embodiment of the washing machine 29, this allows to clean the surface of the mould for forming a patty 121 by ensuring an evacuation of the pieces of food remaining as well as the waste that is extracted from the porous material of the cavity 12.

Figure 4:
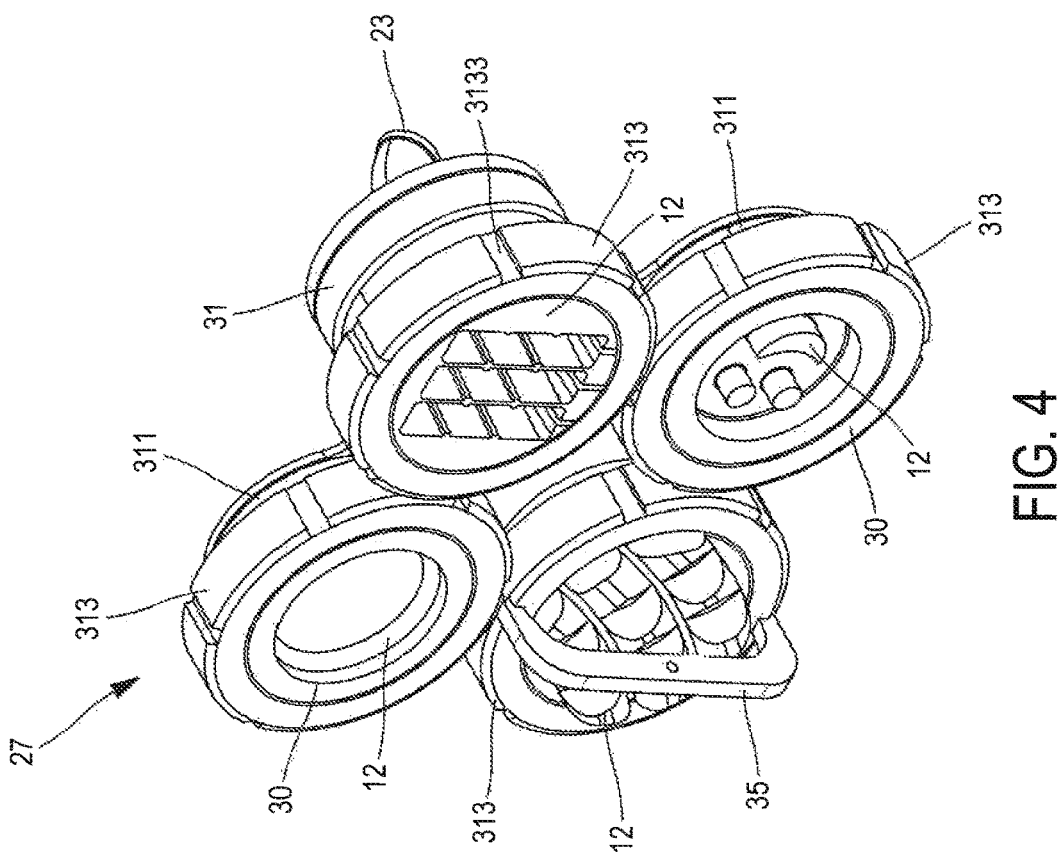
FIG. 4 is a front three-dimensional view of a first embodiment of a washing plate of the washing machine of FIG. 3.
Figure 7:
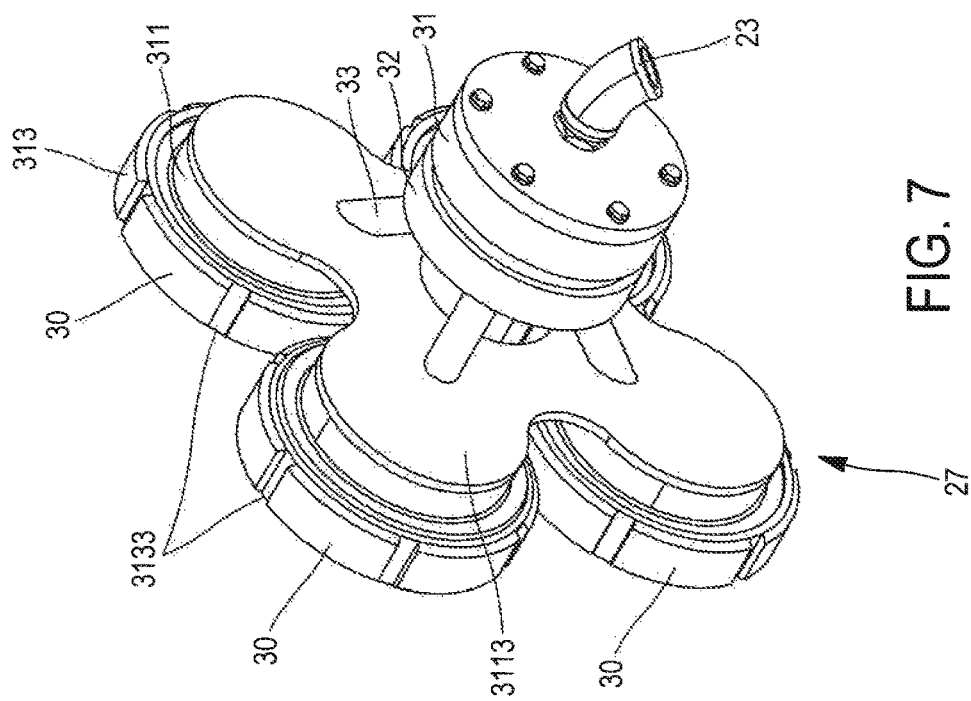
FIG. 7 is a rear three-dimensional view of the washing plate of FIG. 4.
Figure 6:
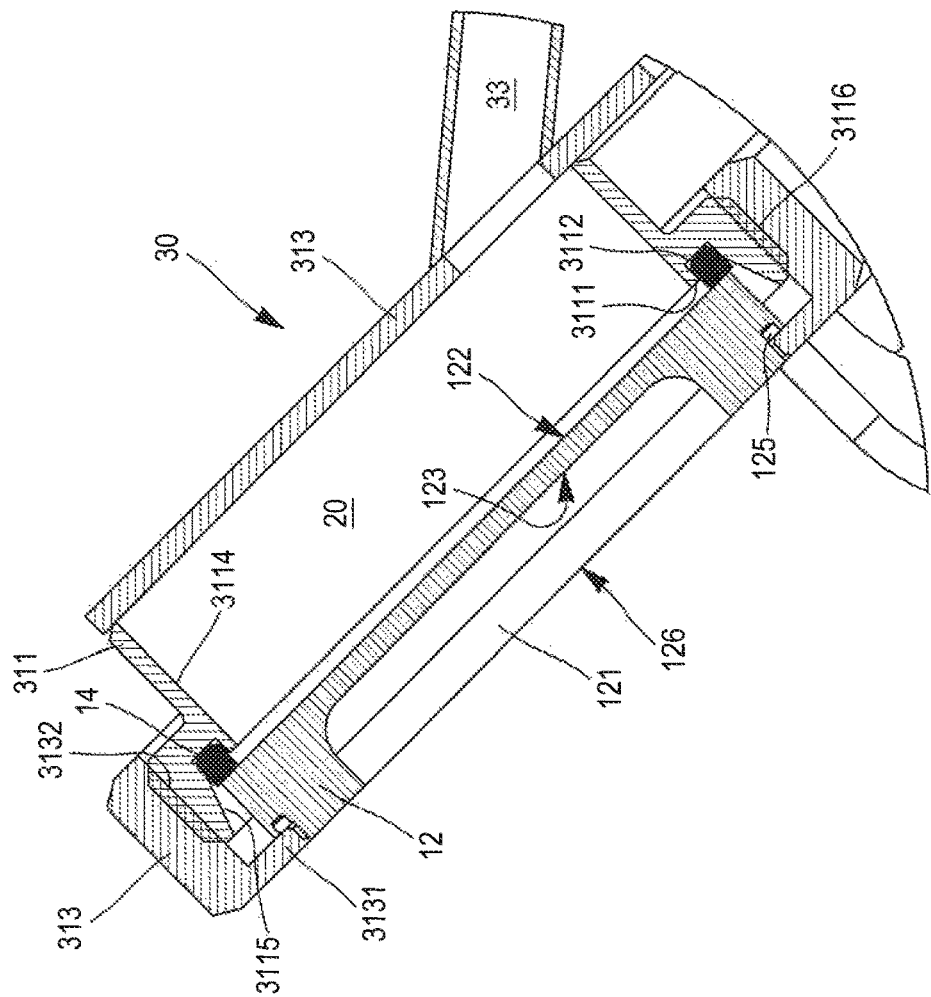
FIG. 6 is a view of the detail VI of FIG. 5.

The equipment 10,30,40,50 according to the invention that is described above allows to only have to manipulate cavities 12 having a given shape, light and having dimensions for being easily manipulatable and transportable from one station to the other, while having varied shapes of the mould for forming a patty 121 (as is illustrated in FIGS. 3 and 4), on the one hand, and, on the other hand, while ensuring optimal ejection and cleaning.

Of course, it is possible to make numerous modifications to the invention without going beyond the context of the latter.

The invention claimed is:

1. An equipment for the formation of patties from a food mass, comprising:
    a cavity holder;
    a cavity arranged so as to be received in the cavity holder, the cavity being made from a material porous to a fluid and comprising an inner face defining a mould for forming a patty and an outer face separated from the inner face by a thickness of porous material;
    a clamping tool for clamping the cavity in the cavity holder, wherein the clamping tool is a clamping nut; and
    a sealing joint interposed between the cavity and one out of the cavity holder and the clamping tool, the sealing joint being arranged so as to constrain the passage of pressurised fluid through the thickness of porous material, brought onto the outer face, and from the outer face towards the inner face; and
    a fluid intake chamber, being partly defined by the outer face of the cavity and being defined by a hollow made in the clamping nut.

2. The equipment according to claim 1, further comprising a second sealing joint interposed between the cavity and the other out of the cavity holder and the clamping tool.

3. The equipment according to claim 1, wherein the fluid intake chamber is defined by a recess made in the cavity holder.

4. The equipment according to claim 3, wherein the cavity holder comprises a pressure measuring duct in the fluid intake chamber.

5. The equipment according to claim 3, wherein the cavity holder comprises a fluid inlet.

6. The equipment according to claim 1, wherein the clamping nut comprises a fluid intake duct into the fluid intake chamber.

7. The equipment according to claim 1, further comprising a spacer positioned between the cavity and the clamping nut, the spacer partly defining the fluid intake chamber.

8. The equipment according to claim 6, further comprising a spacer positioned between the cavity and the clamping nut, the spacer partly defining the fluid intake chamber.

9. The equipment according to claim 8, wherein the spacer comprises a fluid distribution grille onto the outer face of the cavity.

10. The equipment according to claim 9, further comprising an additional sealing joint interposed between the spacer and the cavity and/or an additional sealing joint interposed between the spacer and the clamping nut.

11. The equipment according to claim 8, further comprising an additional sealing joint interposed between the spacer and the cavity and/or an additional sealing joint interposed between the spacer and the clamping nut.

12. A patty forming machine for forming patties from a food mass comprising a mould support, wherein the mould support comprises at least one set of the equipment according to claim 1.

13. The patty forming machine according to claim 12, wherein the mould support is one out of a drum, a rotary plate and a slide.

14. A cavity washing machine, comprising a washing fluid circuit, wherein the washing fluid circuit comprises at least one set of equipment according to claim 1 in fluid connection with the washing fluid circuit.

* * * * *